Patented Dec. 29, 1942

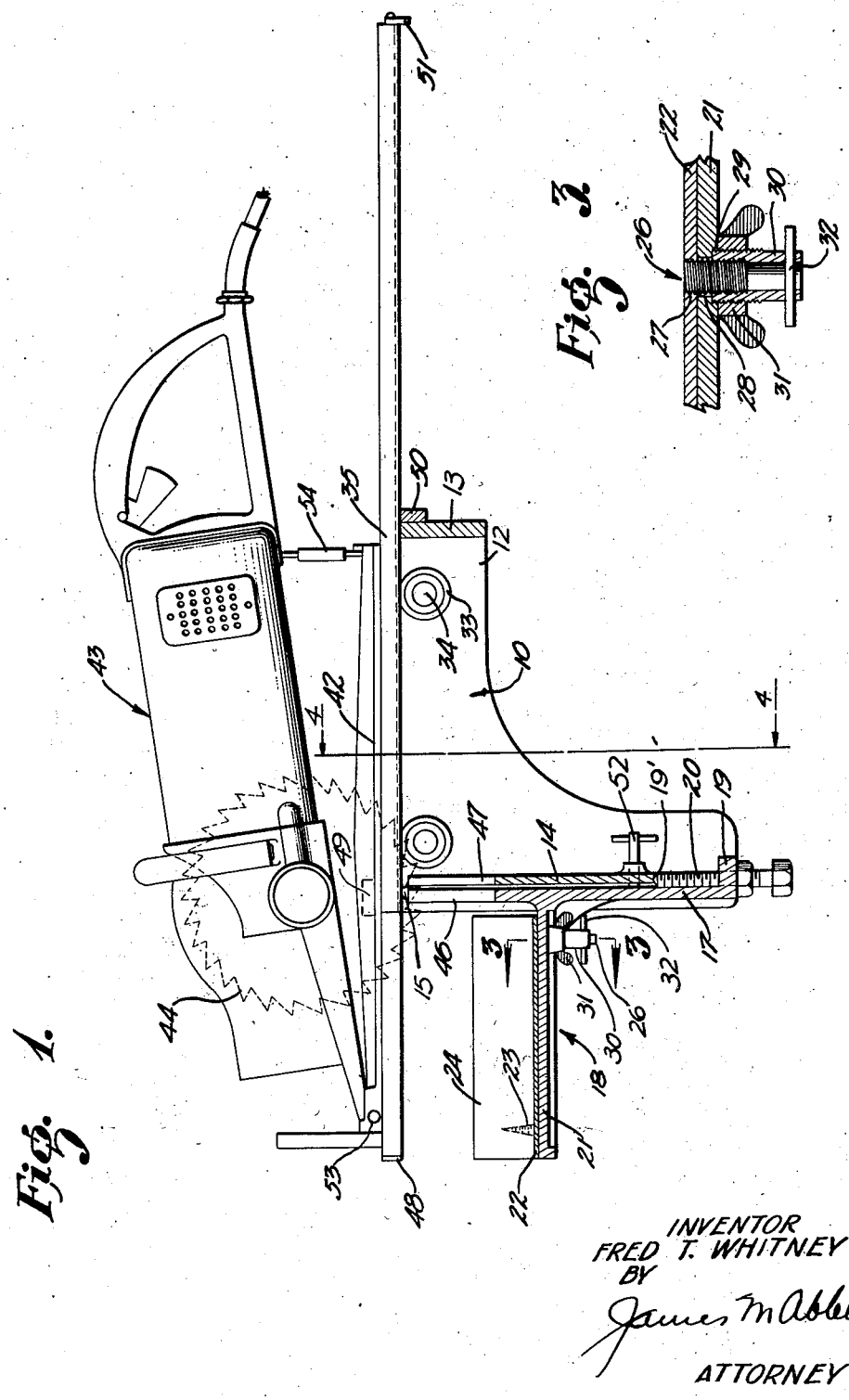
Dec. 29, 1942.  F. T. WHITNEY  2,306,512
MITER-BOX FOR POWER SAWS
Filed Dec. 23, 1939   2 Sheets-Sheet 1
INVENTOR
FRED T. WHITNEY
BY
ATTORNEY Dec. 29, 1942.                F. T. WHITNEY                 2,306,512
                         MITER-BOX FOR POWER SAWS
                         Filed Dec. 23, 1939            2 Sheets-Sheet 2
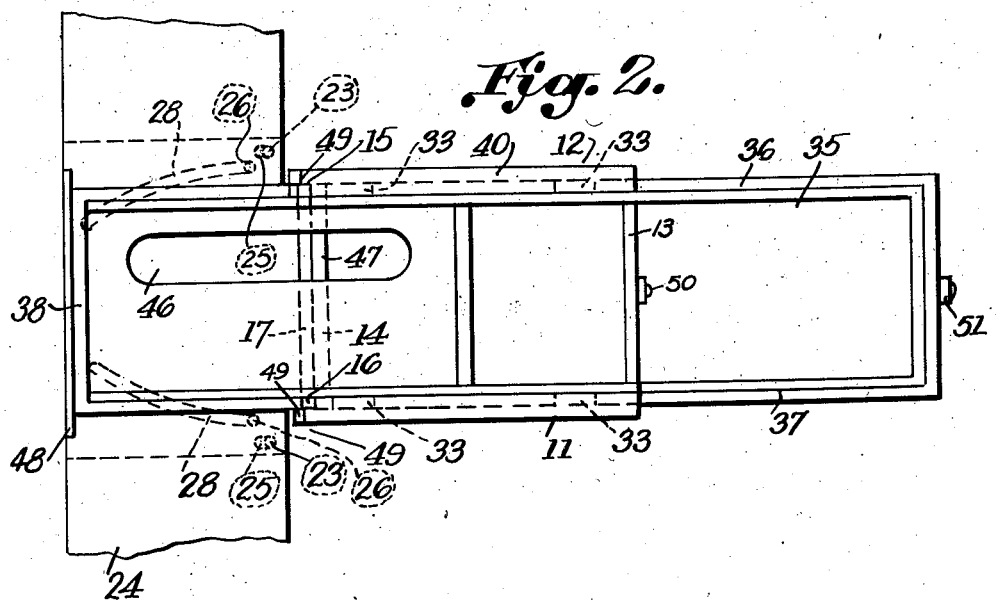
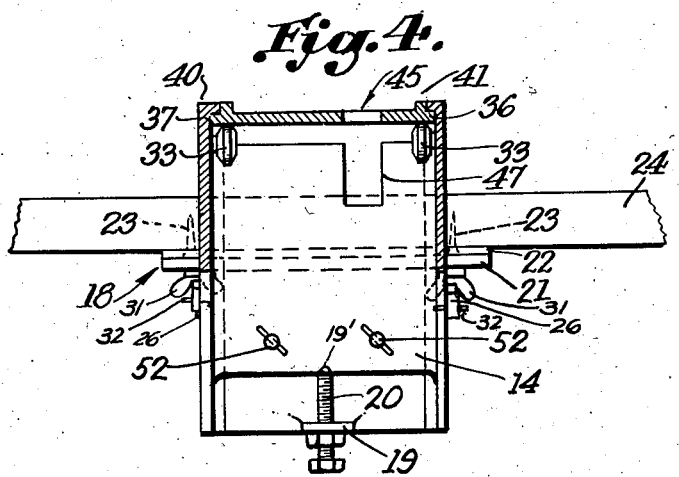
Inventor,
FRED T. WHITNEY
BY James M. Abbott
        ATTY.

2,306,512

UNITED STATES PATENT OFFICE 2,306,512

MITER BOX FOR POWER SAWS

Fred T. Whitney, Los Angeles, Calif.

Application December 23, 1939, Serial No. 310,817

3 Claims. (Cl. 143—6)

This invention relates to woodworking machinery and particularly pertains to a miter-box for power saws.

At the present time it is common practice for carpenters to use portable power saws on construction work, and it is desirable to provide mounting means for these saws which may be readily set up and which makes it possible for the power saw to be easily manipulated in making cuts whether at right angles to their mountings or at oblique angles thereto. It is the principal object of the present invention to provide a portable mounting for power saws which makes it possible for the structure to be readily mounted with relation to a bench or the like, after which the support may be vertically adjusted to a desired working height and may rigidly hold a power saw so that a suitable horizontal movement or stroke of the power saw can be obtained at any desired angle to the work.

The present invention contemplates the provision of attaching means, a base structure carried thereby which is vertically adjustable and upon which a horizontally slidable table is mounted to receive a power saw, the base and its mounting being secured with each other in a manner to guide the power saw directly across a piece of work and at right angles thereto or at oblique angles thereto.

The invention is illustrated by way of example in the accompanying drawings, in which:

Figure 1 is a view in vertical section and elevation showing the complete structure with which the present invention is concerned with parts broken away.

Fig. 2 is a view in plan showing the structure with the power saw removed and indicating in dotted lines the movement of the carriage.

Fig. 3 is an enlarged view in vertical section as seen on the line 3—3 of Figure 1.

Fig. 4 is a view in transverse vertical section through the structure as seen on the line 4—4 of Fig. 1.

Referring more particularly to the drawings, 10 indicates a base structure. This structure is formed with vertical parallel sides 11 and 12, here shown as being substantially angle-shaped. The horizontal leg portion of each of the sides forms a guideway, to be hereinafter described. At the rear end of the horizontal leg of the sides a transverse frame element 13 occurs to tie the rear ends of said horizontal legs together. The sides 11 and 12 are parallel to each other and the vertical leg portions forming a part of the sides extend downwardly and are tied together by a transverse web 14. The web 14 is spaced a distance from the front vertical edge of the sides 11 and 12. In the portion of the sides 11 and 12 in advance of the web 14 and in the opposing faces of the sides 11 and 12 vertical grooves 15 and 16 are cut. Vertically slidable in these grooves and extending between the side walls 11 and 12 is a vertical plate 17 which forms part of a mounting fixture 18 by which the entire power saw unit is mounted upon a support. The vertical plate 17 is formed with a horizontal angle 19 extending rearwardly beneath the transverse web 14 of the frame 10. A set screw is threaded through the portion 19 and extends upwardly and into a V-shaped seat 19' formed in the lower edge of the web 14. Thus, when the mounting structure 18 is rigidly supported, as will be hereinafter described, vertical adjustment of the set screw 20 will act to raise and lower the frame 10 with relation to the mounting 18, after which the web 14 may be locked to the frame by screws 52 threaded through the web 14 and engaging the rear vertical plate 17 of the mounting. The mounting fixture 18 is formed with a horizontal plate 21 at a point substantially midway its height. This plate cooperates with a fastening plate 22 to provide a support for the mounting fixture and the base structure. The fastening plate is held by screws 23 to the under face of a member 24. This member may be a portion of a bench or the like upon which work is supported. The screws 23 extend through slotted openings 25 in the plate to permit some slight adjustment of the plate 22 on the support 24. Rigidly secured to the plate 22 adjacent opposite sides thereof and near the vertical portion 17 are studs 26. These studs are more clearly indicated in Fig. 3 of the drawings, where it will be seen that they are threaded into openings 27 of the fastening plate 22, and that they have a threaded portion which projects downwardly through the horizontal portion 21 of the mounting fixture 18. The horizontal portions 21 are provided at their opposite sides with arcuate slotted openings 28, the slotted opening at one side of the structure being concentric with the pin 26 at the opposite side of the plate. The slotted openings 28 thus accommodate the studs 26 and when one side of the mounting fixture is released, as will be hereinafter described, the mounting fixture will swing around the pivot provided by the other pin 26 and the released pin will travel along its slotted opening 28 so that the structure may be used for making miter cuts.

At the inner ends of the arcuate slots 28 and in the under face of the horizontal portion 21 of the mounting fixture a counterbore 29 is formed. These counterbores receive the upwardly extending end of lock sleeves 30. The lock sleeves 30 are internally threaded to be screwed onto the studs 26. The outer circumferences of the lock sleeves are externally threaded to receive a wing nut 31. The internal and external threads upon the sleeves 30 are preferably of the same pitch. The wing nuts 31 bear against the under face of the portion 21 of the mounting fixture to lock the mounting fixture in a desired horizontally adjusted position beneath the fastening plate 22. A pin 32 extends transversely of the lock sleeves 30 to facilitate their rotation.

Disposed adjacent the top of the base structure and mounted upon the inner faces of the side plates 11 and 12 are rollers 33 which are carried upon horizontal pins 34. These rollers are horizontally aligned and support the weight of a traveling carriage 35. The carriage 35 is rectangular in shape, having opposite side rails 36 and 37, a forward cross rail 38 and a rear cross rail 39. The side rails are guided between upwardly projecting flanges 40 and 41 formed along the upper edges of the side portions 11 and 12. A supporting plate 42 is mounted upon the carriage 35 and receives a power saw 43. This saw structure includes a circular saw blade 44 which may project downwardly through an opening 45 in the portion 42 and pass through slotted openings 46 and 47 in the portions 17 and 14, respectively, of the mounting fixture and the base structure. In order to limit the back stroke of the carriage 35 a spring element 48 is secured transversely of the forward cross member 38 on the carriage and overhangs the sides thereof. This spring element will encounter lugs 49 which extend upwardly from the projecting edges 40 and 41 of the base structure and will limit the retraction of the carriage. In order that the advance of the carriage will be limited a buffer pad 50 is secured to the transverse member 13 of the base structure and may be engaged by a trip finger 51 carried on the transverse portion 39 of the carriage. When it is desired to move the carriage forwardly beyond the buffer 50 the trip finger 51 may be swung upwardly to clear it.

In operation of the present invention the saw 43 is installed at a desired angle upon the plate 42 and the carriage 35. The base structure 10 is then vertically adjusted by the adjusting screw 20, which will raise and lower the base with relation to the mounting fixture 18. After it has been adjusted set screws 52 may be tightened against the vertical portion 17 of the mounting to clamp the base structure 10 in its vertically set position. For a straight cut transversely of the supporting member 24 the lock sleeves 30 are tightened upon the studs 26 and set within the counterbores 29. This prevents lateral movement of the mounting fixture with relation to the fastening plate 22. In the event, however, that a miter cut is to be made in the work the wing nut 31 on the appropriate side of the fastening plate is held tightly while the lock sleeve is rotated to retract it from the wing nut and its seated position within the counterbore 29. It will be evident that the weight will at all times be supported upon the upper face of the wing nut. When the sleeve has been thus retracted the mounting fixture may be swung upon the opposite stud 26, while the released side of the mounting plate 21 will be free to swing with the stud 26 passing along the arcuate slot 28. When the mounting fixture has thus moved to a desired position with relation to the fastening plate 22 the lock sleeve 30 and the wing nut 31 may be tightened against the under face of the plate 21 to hold the structure at a desired angle for cutting purposes. After a cut has been made the elements 30 and 31 may be released so that the mounting fixture may be swung back to its original position. At this time the lock sleeve 30 may be tightened into the counterbore 29 again to hold the entire structure rigidly. In order that the saw 43 may be conveniently adjusted a pivot pin 53 is secured at the forward end of the plate 42 for attachment of the saw. An adjustable fastening member 54 is disposed at the rear end of the plate 42 and beneath the saw to establish angular adjustment.

It will thus be seen that by the structure here shown simple and effective means are provided to mount a portable power saw in operation and to permit it to operate while being supported upon a traveling carriage and while being manipulated to cut a kerf of desired depth and at a desired angle to the length of a piece of timber.

While I have shown the preferred form of my invention as now known to me, it will be understood that various changes may be made in combination, construction and arrangement of parts by those skilled in the art, provided said changes do not depart from the scope of the claims.

Having thus described my invention, what I claim and desire to secure by Letters Patent is:

1. A support for portable power saws, comprising a base structure having a substantially rectangular horizontally extending upper portion and a downwardly extending border portion at one end of said upper portion, pairs of bearing rollers disposed along opposite parallel sides of the upper rectangular portion of the base, a rectangular carriage adapted to rest upon said rollers and to have rectilineal movement lengthwise of the base and thereover, means for mounting a power saw upon the forward end of said carriage, and in a desired vertically adjusted position, a vertically adjusted bracket slidably mounted at the forward end of the base structure, whereby the base structure may move vertically with relation thereto, and an adjusting screw for raising and lowering the base with relation to the bracket, said bracket having a horizontal portion adapted to be secured beneath a fixed work support over which the carriage with its power saw may move.

2. In combination with a supporting base for power saws and the like, a mounting structure including a plate adapted to be disposed horizontally and secured to a face of a fixed support, a horizontal bracket plate extending from the base and lying flush against the mounting plate, said bracket plate being formed with opposed arcuate slots through it, one end of each slot being the center from which the arc of the other slot is struck, a pair of pins extending one through each of said slots and fixed to the mounting plate, whereby the bracket plate may move with relation to the mounting plate as it swings on one or the other of said pins in disposing the bracket plate in angular relation to its normal position on the mounting plate, and lock nuts carried by the pins for clamping the two plates in a set position.

3. In a device of the character described, a base, a bracket plate extending therefrom, a mounting plate carried by a fixed support and against which the bracket plate rests, a pair of pins projecting from the mounting plate and spaced from each other, a pair of arcuate slots formed through said bracket plate in opposed relation to each other, each of said slots being concentric with an end of the opposite slot whereby when one of said pins is in an end of its arcuate slot the plate may swing around the axis thereof and the other pin may move along the other slot, means cooperating with the bracket plate and carried on each of the pins, whereby the pin will be held against movement in the slot and will form a pivot around which the plate may swing, and by which the pins may lock the plates in adjusted relation to each other.

FRED T. WHITNEY.